(12) United States Patent
Zhang

(10) Patent No.: US 11,361,587 B2
(45) Date of Patent: Jun. 14, 2022

(54) AGE RECOGNITION METHOD, STORAGE MEDIUM AND ELECTRONIC DEVICE

(71) Applicant: BOE TECHNOLOGY GROUP CO., LTD., Beijing (CN)

(72) Inventor: Huanhuan Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 78 days.

(21) Appl. No.: 16/840,597

(22) Filed: Apr. 6, 2020

(65) Prior Publication Data

US 2021/0064851 A1 Mar. 4, 2021

(30) Foreign Application Priority Data

Aug. 30, 2019 (CN) .......................... 201910818783.7

(51) Int. Cl.
*G06V 10/20* (2022.01)
*G06V 40/16* (2022.01)
*G06V 10/50* (2022.01)

(52) U.S. Cl.
CPC .......... *G06V 40/171* (2022.01); *G06V 10/255* (2022.01); *G06V 10/507* (2022.01); *G06V 40/178* (2022.01)

(58) Field of Classification Search
CPC ............. G06K 9/00281; G06K 9/3241; G06K 9/4647; G06K 2009/00322
See application file for complete search history.

(56) References Cited

U.S. PATENT DOCUMENTS

| 5,781,650 | A | 7/1998 | Lobo et al. |
| 7,522,773 | B2 | 4/2009 | Gallagher et al. |
| 8,027,521 | B1* | 9/2011 | Moon .................. G06V 40/172 |
| | | | 382/118 |
| 10,121,055 | B1* | 11/2018 | Savvides .............. G06V 40/165 |
| 2006/0153470 | A1* | 7/2006 | Simon .................... H04N 1/628 |
| | | | 382/254 |

(Continued)

FOREIGN PATENT DOCUMENTS

| CN | 104504376 A | 4/2015 |
| CN | 104537630 A | 4/2015 |

(Continued)

OTHER PUBLICATIONS

Sung Eun Choi, Youn Joo Lee, Sung Joo Lee, Kang Ryoung Park, Jaihie Kim; "Age estimation using a hierarchical classifier based on global and local facial features"; Elsevier 2010.*

(Continued)

*Primary Examiner* — Shaghayegh Azima
(74) *Attorney, Agent, or Firm* — Thomas | Horstemeyer, LLP

(57) ABSTRACT

The present disclosure provides an age recognition method, a non-transitory computer-readable storage medium, and an electronic device. The method includes extracting feature points of a face in an image, preprocessing the image to extract global features of the face, extracting local features of the face based on the feature points, determining an age feature of the face according to the global features and the (Continued)

local features, and inputting the age feature into a pre-trained age recognition model to obtain an age value corresponding to the face in the image.

14 Claims, 14 Drawing Sheets

(56) References Cited

U.S. PATENT DOCUMENTS

| | | | |
|---|---|---|---|
| 2011/0081089 A1* | 4/2011 | Mori | G06V 40/171 |
| | | | 382/218 |
| 2012/0230545 A1* | 9/2012 | Zhang | G06K 9/6253 |
| | | | 382/103 |
| 2012/0243742 A1* | 9/2012 | Sato | G06V 40/171 |
| | | | 382/103 |
| 2013/0121584 A1* | 5/2013 | Bourdev | G06V 40/171 |
| | | | 382/190 |
| 2014/0185939 A1* | 7/2014 | Kim | G06T 3/0093 |
| | | | 382/201 |
| 2015/0049910 A1* | 2/2015 | Ptucha | G06F 16/5838 |
| | | | 382/103 |
| 2016/0104309 A1* | 4/2016 | Kim | G06F 16/51 |
| | | | 382/118 |
| 2016/0307324 A1* | 10/2016 | Nakada | G06T 5/50 |
| 2017/0118357 A1* | 4/2017 | Morris | H04N 1/393 |
| 2018/0276454 A1* | 9/2018 | Han | G06V 10/454 |
| 2018/0293429 A1 | 10/2018 | Wechsler et al. | |
| 2018/0373924 A1* | 12/2018 | Yoo | G06F 21/32 |
| 2018/0376072 A1* | 12/2018 | Kwon | A61B 5/0059 |
| 2019/0026586 A1* | 1/2019 | Liu | G06N 3/0454 |
| 2019/0388123 A1* | 12/2019 | Pavlovskaia | G16H 50/50 |
| 2020/0019762 A1* | 1/2020 | Xu | G06Q 20/40145 |
| 2021/0089753 A1* | 3/2021 | Zhang | G06T 7/60 |
| 2021/0248181 A1* | 8/2021 | Zhang | G06F 16/5854 |
| 2021/0251664 A1* | 8/2021 | Pavlovskaia | A61B 5/055 |

FOREIGN PATENT DOCUMENTS

| | | |
|---|---|---|
| CN | 105608448 A | 5/2016 |
| CN | 105809178 A | 7/2016 |
| CN | 105989331 A | 10/2016 |
| CN | 104143097 | 2/2017 |
| CN | 106469298 A | 3/2017 |
| CN | 106778584 A | 5/2017 |
| CN | 107545249 | 1/2018 |
| CN | 107977613 A | 5/2018 |
| CN | 108596011 A | 9/2018 |
| CN | 109271958 | 1/2019 |
| CN | 110069994 A | 7/2019 |

OTHER PUBLICATIONS

Xin Zhang, Thomas Gonnot, Jafar Saniie; "Real-Time Face Detection and Recognition in Complex Background"; Journal of Signal and Information Processing, vol. 8 No. 2, May 2017.*
First Office Action for CN Patent Application No. 201910818783.7 dated Sep. 24, 2021.
S. C. Agrawal, R. K. Tripathi and A. S. Jalal, "Automatic Human Age Estimation System Using Fusion of Local and Global Features," 2017 International Conference on Multimedia, Signal Processing and Communication Technologies (IMPACT), 2017, pp. 5-9, doi: 10.1109/MSPCT.2017.8363882.
Yuan Liao, Facial Age Recognition Technology Based on Convolution Neural Network (Nov. 2018).
Non-Final Office Action for U.S. Appl. No. 16/815,613 dated Jun. 10, 2021.

* cited by examiner

AGE RECOGNITION METHOD, STORAGE MEDIUM AND ELECTRONIC DEVICE

CROSS-REFERENCE TO RELATED APPLICATION

This application claims the benefit of and priority to Chinese Patent Application No. 201910818783.7 filed on Aug. 30, 2019, the contents of which being incorporated by reference in their entirety herein.

TECHNICAL FIELD

Embodiments of the present disclosure relates to computer process technologies and, in particular, to an age recognition method, a non-transitory computer-readable storage medium, and an electronic device.

BACKGROUND

Face recognition is a kind of biometric recognition technology which identifies a person based on face feature information of the person. Generally, a camera or a webcam is used to collect an image or video stream containing a human face, and the human face in the image is automatically detected and tracked. Then, face recognition is performed on the detected face. Face recognition can also be referred to as portrait recognition or facial recognition. With the development of face recognition technologies, there is an increasing demand for recognition of face attributes, especially age recognition of faces. At present, deep learning technology of convolutional neural networks (CNNs) is used to identify the age of the face of a person. Although the algorithm has high accuracy, the algorithm is complex, time-consuming, and imposes high computational requirements on computer hardware.

In view of this, there is an urgent need in the art to develop a new age recognition method.

It should be noted that the information disclosed in the Background section above is only for enhancing the understanding of the background of the present disclosure and thus, may include information that does not constitute prior art known to those of ordinary skill in the art.

SUMMARY

According to a first aspect of the present disclosure, an age recognition method is provided, including:
extracting feature points of a face in an image, and preprocessing the image to extract global features of the face;
extracting local features of the face based on the feature points, and determining an age feature of the face according to the global features and the local features; and
inputting the age feature into a pre-trained age recognition model to obtain an age value corresponding to the face in the image.

According to a second aspect of the present disclosure, an age recognition model training method is provided, including:
detecting and extracting feature points of a face in an image sample, and preprocessing the sample to extract global features of the face;
extracting local features of the face based on the feature points, and determining an age feature of the face according to the global features and the local features; and
based on the age feature and age value samples, training an age recognition model by a support vector machine.

According to a third aspect of the present disclosure, a non-transitory computer-readable storage medium is provided having stored thereon a computer program, where, when the computer program is executed by at least one hardware processor, the age recognition method or the age recognition model training method according to any one of the above-described embodiments is implemented.

According to a fourth aspect of the present disclosure, an electronic device is provided, including:
at least one hardware processor;
a memory for storing instructions executable by the at least one hardware processor;
wherein the at least one hardware processor is configured to perform the age recognition method or the age recognition model training method according to any one of the above-described embodiments by executing the executable instructions.

As can be seen from the above technical solutions, the age recognition methods, the age recognition model training methods, the computer storage medium, and the electronic device in the exemplary embodiments of the present disclosure have at least the following advantages.

In the methods provided by the exemplary embodiments of the present disclosure, age features are obtained according to both global features and local features of a face, and the age features are input to an age recognition model to determine an age value of the face. On one hand, the impact of different image resolutions, genders, different poses, and expressions on face age recognition is reduced. On the other hand, the algorithm has high accuracy and speed, and can also be used for face age recognition based on embedded devices.

It should be understood that the above general description and the following detailed description are merely exemplary, and should not be considered as limiting the present disclosure.

BRIEF DESCRIPTION OF THE DRAWINGS

The drawings are incorporated in and constitute a part of the specification, illustrate embodiments consistent with the present disclosure, and together with the description serve to explain the principles of the present disclosure. Understandably, the drawings in the following description are just some exemplary embodiments of the present disclosure. For those of ordinary skill in the art, other drawings can be obtained based on these drawings without creative efforts.

DETAILED DESCRIPTION

Figure 1:
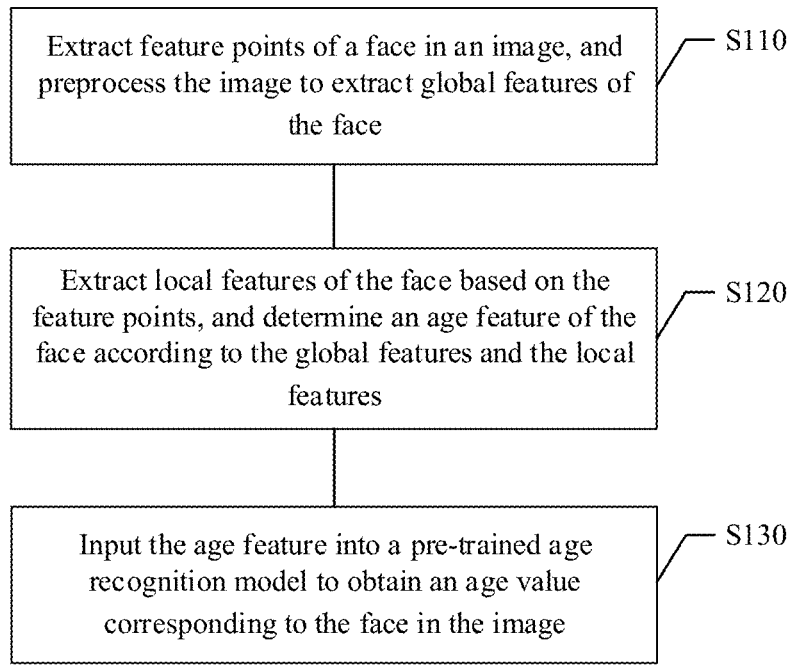
FIG. 1 schematically illustrates a flowchart of an age recognition method according to an exemplary embodiment of the present disclosure.

Example embodiments will now be described more fully with reference to the accompanying drawings. However, the embodiments can be implemented in a variety of forms and should not be construed as being limited to the examples set forth herein. Rather, these embodiments are provided so that the present disclosure will be more complete so as to convey the idea of the exemplary embodiments to those skilled in this art. The described features, structures, or characteristics in one or more embodiments may be combined in any suitable manner. In the following description, many specific details are provided to give a full understanding of the embodiments of the present disclosure. However, those skilled in the art will realize that the technical solutions of the present disclosure may be practiced with omitting one or more of the specific details, or other methods, components, devices, steps, etc. may be adopted. In other cases, well-known technical solutions are not shown or described in detail to avoid obscuring aspects of the present disclosure.

The terms "one," "a," "the," and "said" are used to indicate that there are one or more elements, components, or the like. The terms "include," "contain," and "have" are used to indicate an open type meaning of including and means that there may be additional elements, components, etc. in addition to the listed elements/components/etc. The terms "first" and "second" are used to distinguish objects and not used for limiting the number of the objects.

In addition, the drawings are merely schematic illustrations of the present disclosure and are not necessarily drawn to scale. The same reference numerals in the drawings represent the same or similar parts and thus, repeated descriptions thereof will be omitted. Some block diagrams shown in the drawings are functional entities and do not necessarily have to correspond to physically or logically independent entities.

In view of the problems existing in the related art, the present disclosure proposes an age recognition method. FIG. 1 shows a flowchart of the age recognition method. As shown in FIG. 1, the age recognition method includes at least the following steps:

In step S110, feature points of a face in an image are extracted and the image is preprocessed to extract global features of the face.

In step S120, local features of the face are extracted based on the feature points, and an age feature of the face is determined according to the global features and the local features.

In step S130, the age feature is input into a pre-trained age recognition model to obtain an age value corresponding to the face in the image.

In the exemplary embodiment of the present disclosure, age features are obtained according to both global features and local features of a face, and the age features are input to an age recognition model to determine an age value of the face. On one hand, the impact of different image resolutions, genders, different poses, and expressions on face age recognition is reduced. On the other hand, the algorithm has high accuracy and speed, and can also be used for face age recognition based on embedded devices.

Each step of the age recognition method is described in detail below.

In step S110, feature points of a face in an image are extracted and the image is preprocessed to extract global features of the face.

In an exemplary embodiment of the present disclosure, the Dlib vision library can be used for face detection and extraction of 68 feature points of a face. The 68 feature points of the human face are mainly distributed in the eyebrows, eyes, nose, mouth, and facial contours.

Figure 2:
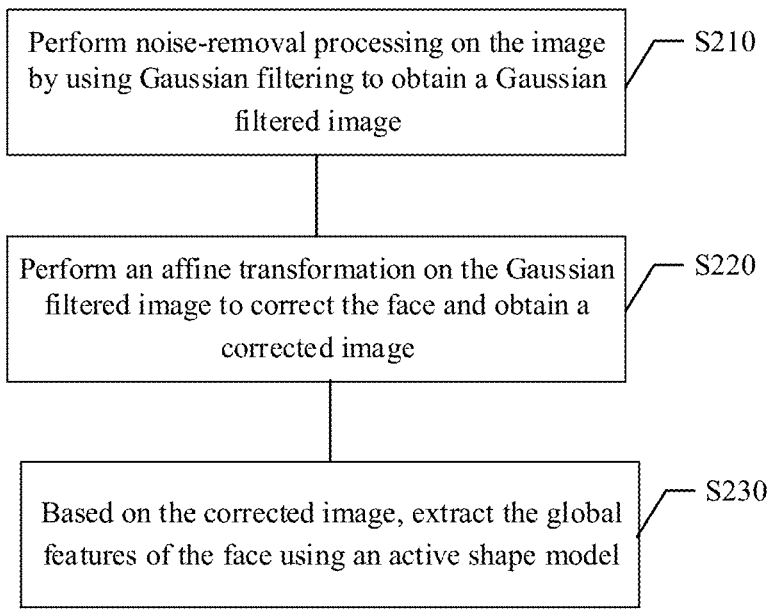
FIG. 2 is a schematic flowchart of a method for extracting global features of a face according to an exemplary embodiment of the present disclosure.

FIG. 2 is a schematic flowchart of a method for extracting global features of a face. As shown in FIG. 2, the method includes at least the following steps:

In step S210, noise-removal processing is performed on the image by using Gaussian filtering to obtain a Gaussian filtered image.

Gaussian filtering is a type of linear smoothing filtering technology, which can perform weighted averaging on the image. That is, the value of each pixel in the image is obtained by a weighted average of the pixel value itself and other pixel values in the neighborhood so as to remove noise in the image, and the processed image is determined as a Gaussian filtered image.

In step S220, an affine transformation is performed on the Gaussian filtered image to correct the face, and a corrected image is obtained.

The initial input image may be deformed to some extent due to shooting angle, light intensity, and so on. In order to facilitate subsequent extraction of face features, an affine transformation may be performed on the Gaussian filtered image. The affine transformation can be an affine transformation or an affine mapping between two vector spaces and consists of a non-singular linear transformation followed by a translation transformation. According to the extracted feature points of the face, the left eye center and the right eye center of the face can be determined respectively. The left eye center, the right eye center line, and the horizontal line have a certain angle after driving the face deformation, the line connecting the centers of the left eye and the right eye is parallel to the horizontal line so as to correct the posture of the face, and accordingly, the face is in the correct position in the phase plane. In addition, other points that can be used for correction can also be determined according to the extracted feature points, which is not particularly limited in this exemplary embodiment. For example, an affine transformation function in OpenCV can be used to perform affine transformation on the Gaussian filtered image. In addition, other methods for implementing the affine transformation may be used, which is not particularly limited in this exemplary embodiment. The image corrected by the affine transformation is determined as a corrected image and global features of the human face may be extracted based on the corrected image.

In step S230, based on the corrected image, the global features of the face are extracted using an active shape model.

The active shape model (ASM) is a method for extracting global features of a face based on a statistical learning model. ASM can first train a learning model and then use the learning model to extract the global features of a face based on the key points of the face. The ASM technology can accurately extract the feature point information of face features as the global features of the face.

In this exemplary embodiment, the image is subjected to noise-removal process and geometric correction, to maintain the facial details of the face to a greater extent, correct the position of the face, and improve the accuracy of global feature extraction and age recognition.

In step S120, local features of the face are extracted based on the feature points, and an age feature of the face is determined according to the global features and the local features.

Figure 3:
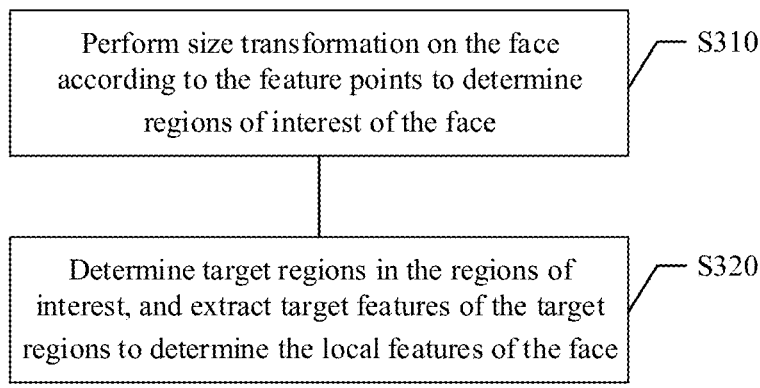
FIG. 3 schematically illustrates a flowchart of a method for extracting local features of a face according to an exemplary embodiment of the present disclosure.

FIG. 3 schematically illustrates a flowchart of a method for extracting local features of a face. As shown in FIG. 3, the method includes at least the following steps:

In step S310, the feature points are obtained, and size transformation is performed on the face according to the feature points to determine regions of interest of the face.

After the feature points of the face are obtained, the ordinate values of all the feature points can be determined and then, the maximum and minimum values of the ordinates can be determined. Then, the difference L between the maximum and minimum values can be calculated. The image is scaled according to the ratio N/L, where N can be 32, 64, 128, or the like, which is not particularly limited in this exemplary embodiment. It should be noted that the smaller the value of N is, the faster the scaling will be. According to an exemplary embodiment, N can be set to 64. Similarly, the abscissa values of all feature points are determined, the maximum and minimum values of the abscissa are determined, and then the difference between the maximum and minimum values of the abscissa is calculated and the image is scaled in the same proportion. The method is the same as the scaling method of the ordinates, which is not repeated here. Changing the size of the face can unify the face size in the image, which is convenient for uniformly obtaining regions of interest and extracting local features. According to the feature points, 11 regions of interest (ROI) such as the forehead, chin, nose, eye corners, cheeks, and mouth corners of a human face can be determined. The regions of interest may be regions to be processed which are outlined by a rectangular frame from the processed image. In addition, other graphics may be used to outline the regions of interest, which is not particularly limited in this exemplary embodiment.

In step S320, target regions in the regions of interest are determined and target features of the target regions are extracted to determine the local features of the face.

Figure 4:
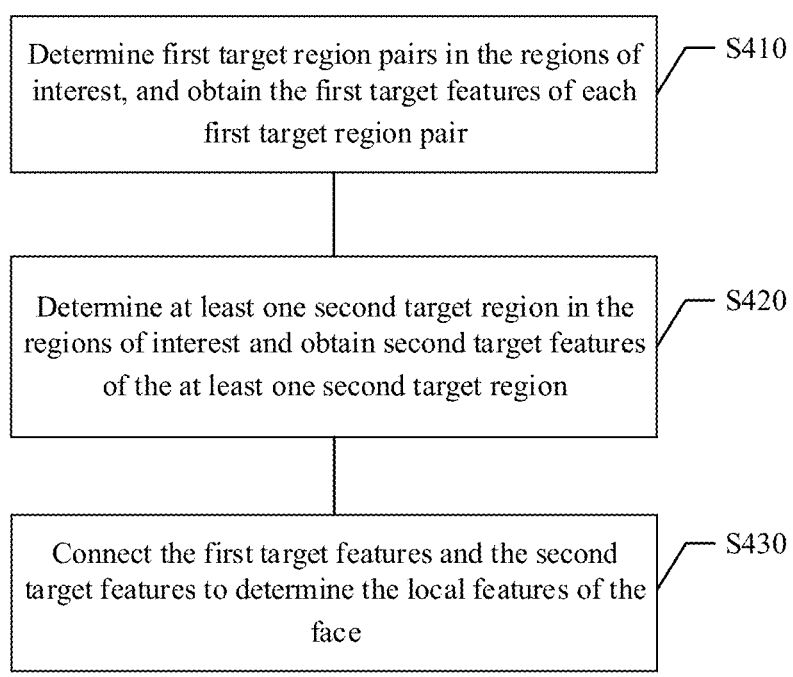
FIG. 4 is a schematic flowchart of a method for determining local features of a face according to an exemplary embodiment of the present disclosure.

In an exemplary embodiment, the target regions include first target regions and at least one second target region, and the target features include first target features and second target features. FIG. 4 is a schematic flowchart of a method for determining local features of a face. As shown in FIG. 4, the method includes at least the following steps:

In step S410, first target region pairs in the regions of interest are determined, where each of the first target region pairs comprises two first target regions which have a symmetrical relationship with each other, and the first target features of each first target region pair are obtained.

Figure 5:
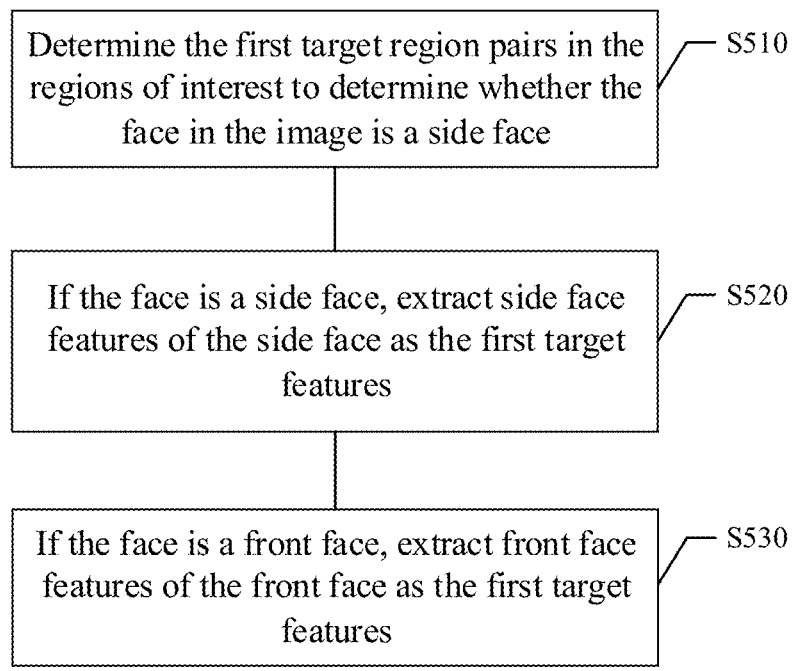
FIG. 5 is a schematic flowchart of a method for determining first target features according to an exemplary embodiment of the present disclosure.

FIG. 5 is a schematic flowchart of a method for determining first target features. As shown in FIG. 5, the method includes at least the following steps:

In step S510, the first target region pairs in the regions of interest are determined to determine whether the face in the image is a side face.

Among the 11 selected regions of interest of the face, there may be 4 pairs of first target regions, and each pair includes two first target regions which have a symmetrical relationship with each other.

Figure 6:
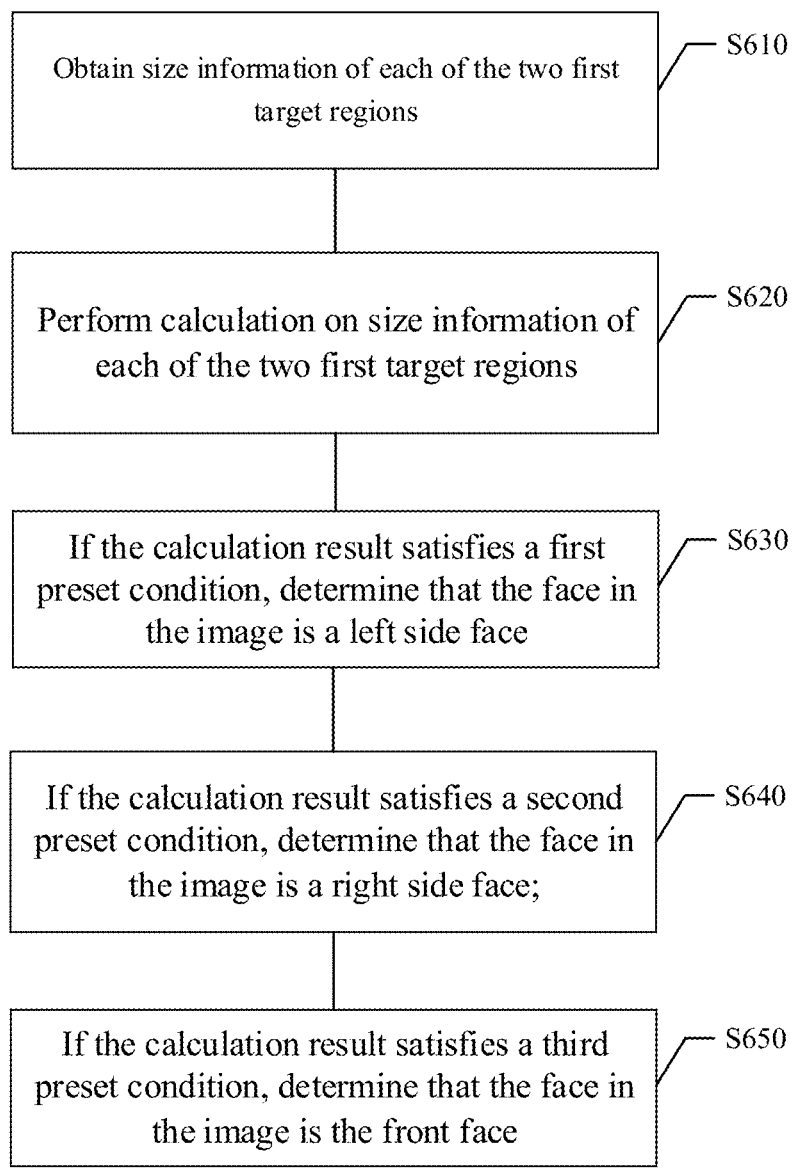
FIG. 6 is a schematic flowchart of a method for determining whether a face is a side face according to an exemplary embodiment of the present disclosure.

FIG. 6 is a schematic flowchart of a method for determining whether a face is a side face. As shown FIG. 6, the method includes at least the following steps:

In step S610, size information of each of the two first target regions is obtained.

For example, the regions of interest with a symmetric relationship can be regions 1, 2, 3, 4, 5, 6, 7, and 8, where regions 1 and 2 are symmetrical regions and can form a target region pair, regions 3 and 4 are symmetrical regions can form a target region pair, regions 5 and 6 are symmetrical regions can form a target region pair, and regions 7 and 8 are symmetrical regions can form a target region pair. The size information of each of the two target regions in each pair may be width information of each of the two target regions, or may be other size information which is not specifically limited in this exemplary embodiment.

In step S620, calculation is performed on size information of each of the two first target regions.

For example, the calculation performed on size information of each of the two first target regions may be calculating a proportional relationship between size information of one of the two first target regions and size information of the other one of the two first target regions, for example, calculating a ratio between the width information of the two first target regions. Because the human face is symmetrical, by calculating the proportion of the widths of the symmetrical regions, a determination can be made whether the face is a front face or a side face. In other words, a determination can be made whether the face is a frontward facing face or a sideward facing face.

In step S630, if the calculation result satisfies a first preset condition, it is determined that the face in the image is a left side face.

The first preset condition may be a preset condition for determining whether the face is the left side face according to the calculation result. For example, the first preset condition may be that a ratio of the size information of a left one of the two first target regions to the size information of a right one of the two first target regions is greater than 2. Therefore, if the ratio of the width of the left one of the two first target regions to the width of the right one of the two first target regions is greater than 2, it can be determined that the human face in the image is the left side face. In addition, the ratio in the first preset condition may also be set as other values, and other first preset conditions may also be set, which is not specifically limited in this exemplary embodiment.

In step S640, if the face determination information satisfies a second preset condition, it is determined that the face in the image is a right side face.

The second preset condition may be a preset condition for determining whether the face is the right side face according to the calculation result. For example, the second preset condition may be that a ratio of the size information of the left one of the two first target regions to the size information of the right one of the two first target regions is smaller than 0.5. Therefore, if the ratio of the width of the left one of the two first target regions to the width of the right one of the two first target regions is smaller than 0.5, it can be determined that the human face in the image is the right side face. In addition, the ratio in the second preset condition may be set to other values, and other second preset conditions may also be set, which is not specifically limited in this exemplary embodiment.

In step S650, if the calculation result satisfies a third preset condition, it is determined that the face in the image is the front face.

The third preset condition may be a preset condition for determining whether the face is the front face according to the calculation result. For example, the third preset condition may be that a ratio of the size information of the left one of the two first target regions to the size information of the right one of the two first target regions is greater than or equal to 0.5 and smaller than or equal to 2. Therefore, if the ratio of the width of the left one of the two first target regions to the width of the right one of the two first target regions is greater than or equal to 0.5 and smaller than or equal to 2, it can be determined that the human face in the image is a front face. In addition, the ratio in the third preset condition may also be set as other values, and other third preset conditions may also be set, which is not specifically limited in this exemplary embodiment.

In this exemplary embodiment, a method for determining whether a human face in the image is the left side face, the right side face, or the front face is provided. The calculation is smooth, the determination method is simple, and the practicability is extremely strong.

In step S520, if the face is a side face, side face features of the side face are extracted as the first target features.

Figure 7:
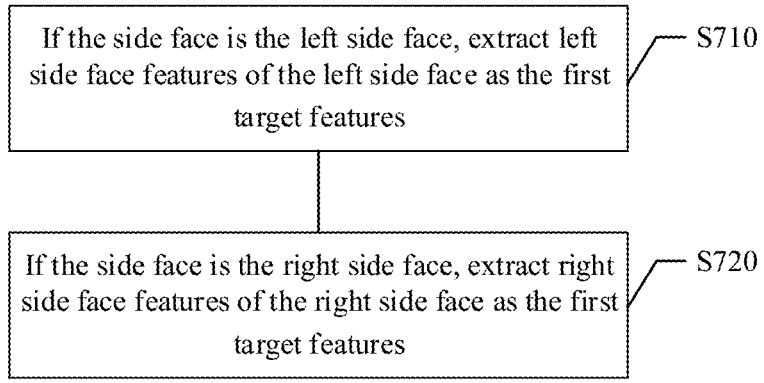
FIG. 7 is a schematic flowchart of a method for determining side face features according to an exemplary embodiment of the present disclosure.

FIG. 7 is a schematic flowchart of a method for determining side face features. As shown in FIG. 7, the method includes at least the following steps:

In step S710, if the side face is the left side face, left side face features of the left side face are extracted as the first target features.

Figure 8:
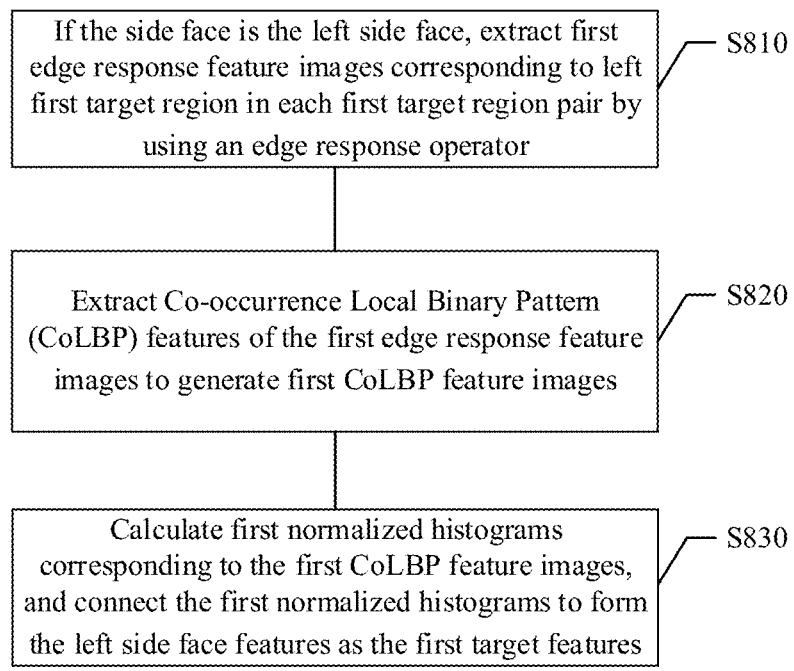
FIG. 8 is a schematic flowchart of a method for determining side face features according to an exemplary embodiment of the present disclosure.

FIG. 8 is a schematic flowchart of a method for determining left side face features. As shown in FIG. 8, the method includes at least the following steps:

In step S810, if the side face is the left side face, first edge response feature images corresponding to left first target region in each first target region pair are extracted by using an edge response operator.

When using the edge response operator to extract the first edge response feature images, k extraction directions may be first divided. The edge response operator may be a Sobel operator or other edge response operators, which is not particularly limited in this example embodiment. Because the wrinkles on the human face, such as the wrinkles at corners of the eyes, wrinkles the corners of the mouth, etc. are all radial, k can be set to 8. That is, edge response operators in eight directions are used to extract first edge response feature images in in eight directions in the left first target region. In addition, the number of directions can vary, which is not particularly limited in this exemplary embodiment.

In step S820, Co-occurrence Local Binary Pattern (CoLBP) features of the first edge response feature images are extracted to generate first CoLBP feature images.

The CoLBP features can be constructed by some predefined co-occurrence patterns. Therefore, the CoLBP features can be obtained according to extracted local binary pattern features to generate first CoLBP feature images.

Correspondingly, eight first CoLBP feature images can be generated based on the first edge response feature images extracted in eight directions.

In step S830, first normalized histograms corresponding to the first CoLBP feature images are calculated, and the first normalized histograms are connected to form the left side face features as the first target features.

The first normalized histograms of the eight first CoLBP feature images are calculated respectively, and the eight first normalized histograms are connected in a clockwise direction or a counterclockwise direction to form first target features. In addition, other connection modes may be used, and this example embodiment does not specifically limit this.

In this example embodiment, when CoLBP is used to extract left side face features, the calculation method and the expression method are simple, the speed of extracting the left side face features is fast, and the extraction method is practical.

In step S720, if the side face is the right side face, right side face features of the right side face are extracted as the first target features.

Figure 9:
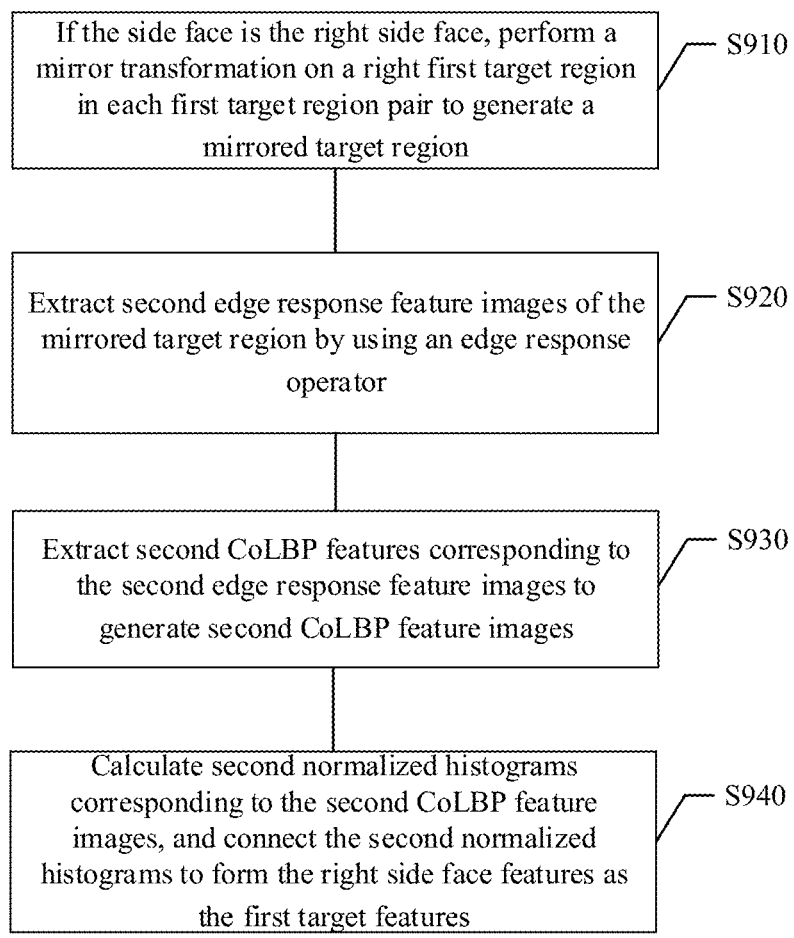
FIG. 9 schematically illustrates a flowchart of a method for determining side face features according to an exemplary embodiment of the present disclosure.

FIG. 9 schematically illustrates a flowchart of a method for determining right side face features. As shown in FIG. 9, the method includes at least the following steps:

In step S910, if the side face is the right side face, a mirror transformation is performed on a right first target region in each first target region pair to generate a mirrored target region.

In view of the left-right symmetry of the human face, the mirror transformation can be a horizontal mirror transformation, that is, the left and right ones of the first target regions can be mirror-transformed with the vertical center axis of the human face as the center. If the face in the image is the right side face, mirror transformation may be performed on the right one in each first target region pair to generate a mirrored target region.

In step S920, second edge response feature images of the mirrored target region are extracted by using an edge response operator.

When using the edge response operator to extract second edge response feature images, k extraction directions can be divided first. The edge response operator may be a Sobel operator or other edge response operators, which is not particularly limited in this exemplary embodiment. In view of the foregoing, the wrinkles on the human face, such as wrinkles at eye corner, wrinkles at mouth corners, etc. are all radial, k can be set to 8. That is, edge response operators in eight directions are used to extract second edge response feature images in eight directions in the mirrored target region. In addition, the number of directions can vary, which is not particularly limited in this exemplary embodiment.

In step S930, second CoLBP features corresponding to the second edge response feature images are extracted to generate second CoLBP feature images.

The second CoLBP features can be constructed by some predefined co-occurrence patterns. Therefore, the second CoLBP features can be obtained according to extracted local binary pattern features to generate second CoLBP feature images. Correspondingly, eight second CoLBP feature images can be generated based on the second edge response feature images extracted in the eight directions.

In step S940, second normalized histograms corresponding to the second CoLBP feature images are calculated, and the second normalized histograms are connected to form the right side face features as the first target features. The second normalized histograms of the eight second CoLBP feature images are calculated respectively, and the eight second normalized histograms are connected in a clockwise direction or a counterclockwise direction to form first target features. In addition, other connection modes may be used, and this exemplary embodiment does not specifically limit this.

In this exemplary embodiment, CoLBP is used to extract right side face features, the calculation method is simple, and the expression method is simple, the speed of extracting the right side face features is fast and the extraction method is practical. In addition, side face features are extracted for different side face regions and transformation is performed, to uniformly extract side face features in different images.

In step S530, if the face is a front face, front face features of the front face are extracted as the first target features.

Figure 10:
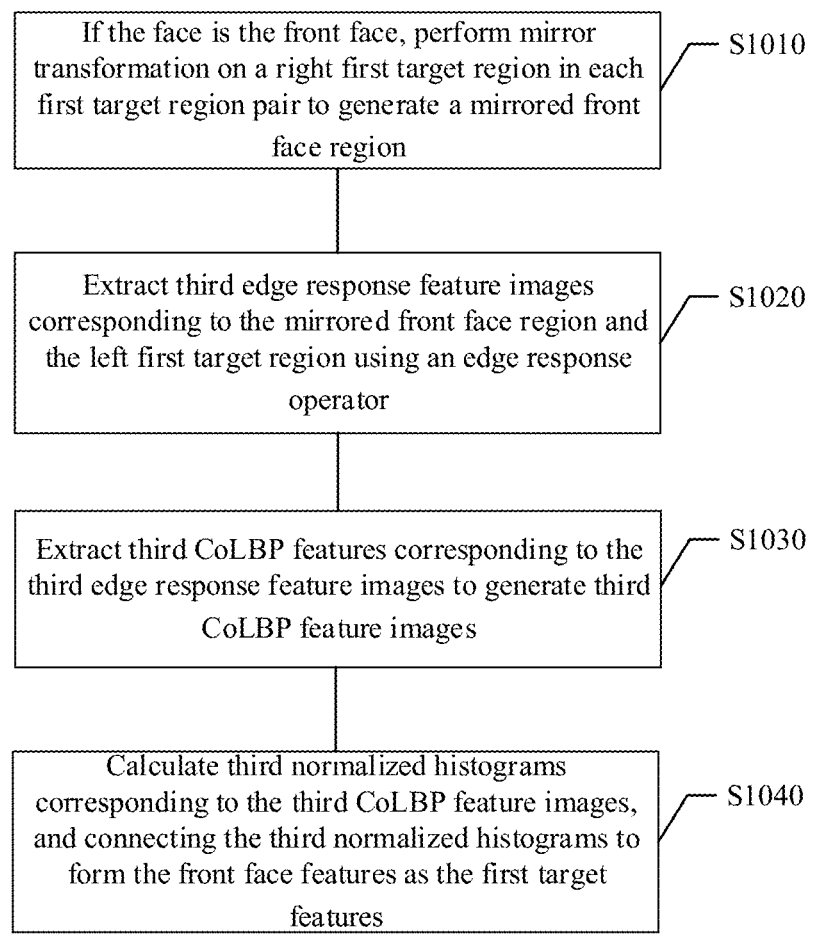
FIG. 10 is a schematic flowchart of a method for determining front face features according to an exemplary embodiment of the present disclosure.

FIG. 10 is a schematic flowchart of a method for determining front face features. As shown in FIG. 10, the method includes at least the following steps:

In step S1010, if the face is the front face, mirror transformation is performed on a right first target region in each first target region pair to generate a mirrored front face region.

In view of that the wrinkles on the human face, such as wrinkles at eye corners, wrinkles mouth corners, etc. are symmetrically distributed in radial shape, in order to ensure the directivity of feature extraction on the front face and reduce interference, the right first target region in each first target region pair can be mirror-transformed. In addition, the human face is left-right symmetrical, and the mirror transformation may be a horizontal mirror transformation, that is, the left and right ones of the first target region pair can mirror-transformed around the vertical center axis of the human face. In other embodiments, the left first target region in each first target region pair can be mirror-transformed, and embodiments of the present disclosure do not impose specific limitations on this.

In step S1020, third edge response feature images corresponding to the mirrored front face region and the left first target region are extracted using an edge response operator.

When using the edge response operator to extract the third edge response feature images, k extraction directions may be first divided. The edge response operator may be a Sobel operator or other edge response operators, which is not particularly limited in this exemplary embodiment. Because the wrinkles on the human face, such as the wrinkles at corners of the eyes, wrinkles the corners of the mouth, etc. are all radial, k can be set to 8. That is, edge response operators in eight directions are used to extract third edge response feature images in eight directions in the mirrored front face region and the left first target region. In addition, the number of directions can vary, which is not particularly limited in this exemplary embodiment.

In step S1030, third CoLBP features corresponding to the third edge response feature images are extracted to generate third CoLBP feature images.

The third CoLBP features can be constructed by some predefined co-occurrence patterns. Therefore, the third CoLBP features can be obtained according to extracted local binary pattern features to generate third CoLBP feature images. Correspondingly, eight third CoLBP feature images can be generated based on the third edge response feature images extracted in the eight directions.

In step S1040, third normalized histograms corresponding to the third CoLBP feature images are calculated, and the third normalized histograms are connected to form the front face features as the first target features.

The third normalized histograms corresponding to the third CoLBP feature images are traversed and calculated simultaneously, and then the eight third normalized histograms are connected in a clockwise or counterclockwise direction to form the first target features. In addition, other connection modes may be used, and this exemplary embodiment does not specifically limit this.

In this exemplary embodiment, CoLBP is used to extract front face features of a human face, the calculation method is simple, and the expression method is simple, the speed of extracting the front face features is fast and the extraction method is practical.

In step S420, at least one second target region in the regions of interest is determined and second target features of the at least one second target region are obtained.

Figure 11:
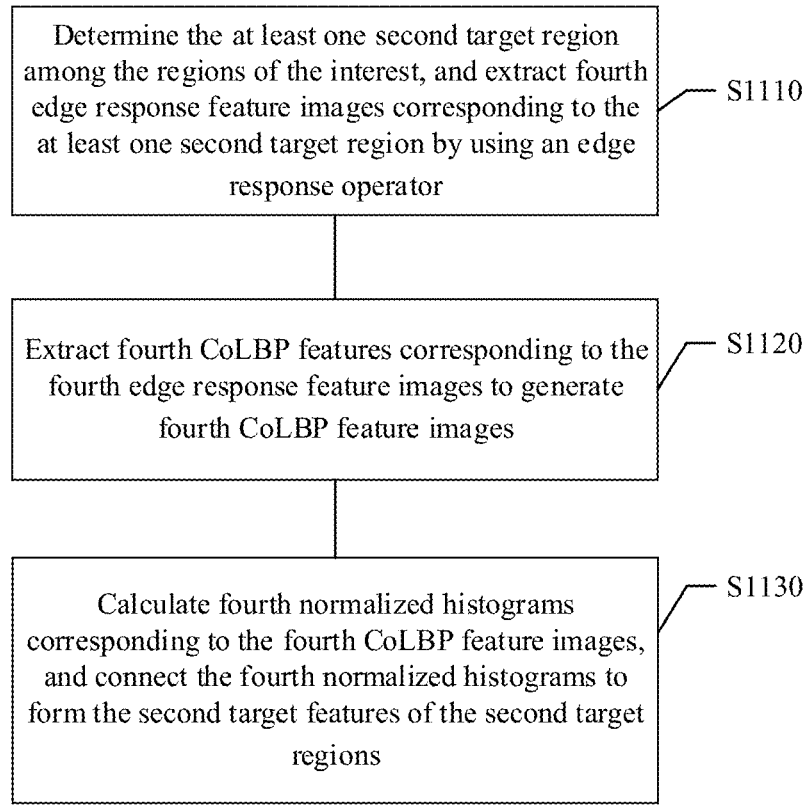
FIG. 11 is a schematic flowchart of a method for forming second target features according to an exemplary embodiment of the present disclosure.

FIG. 11 is a schematic flowchart of a method for forming second target features. As shown in FIG. 11, the method includes at least the following steps:

In step S1110, the at least one second target region among the regions of the interest is determined, and fourth edge response feature images corresponding to the at least one second target region are extracted by using an edge response operator.

The second target region may be a region of interest that does not have a symmetrical relationship with other region of interest. For example, the regions of interest may be regions 1, 2, 3, 4, 5, 6, 7, 8, 9, 10, and 11, where the regions of interest which have a symmetrical relationship with each other may be regions 1, 2, 3, 4, 5, 6, 7, and 8, and the remaining regions 9, 10, and 11 do not have a symmetrical relationship with other regions, and can be determined as the second target regions. These three regions may be the forehead, the bridge of the nose, and the mouth, of a human face, or may be other parts according to different division methods, which are not specifically limited in this exemplary embodiment. When using the edge response operator to extract the fourth edge response feature images, k extraction directions may be first divided. The edge response operator may be a Sobel operator or other edge response operators, which is not particularly limited in this exemplary embodiment. Because the wrinkles on the human face, such as the wrinkles at corners of the eyes, wrinkles the corners of the mouth, etc. are all radial, k can be set to 8. That is, edge response operators in eight directions are used to extract fourth edge response feature images in eight directions in the second target regions. In addition, the number of directions can vary, which is not particularly limited in this exemplary embodiment.

In step S1120, fourth CoLBP features corresponding to the fourth edge response feature images are extracted to generate fourth CoLBP feature images.

The fourth CoLBP features can be constructed by some predefined co-occurrence patterns. Therefore, the fourth CoLBP features can be obtained according to extracted local binary pattern features to generate fourth CoLBP feature images. Correspondingly, eight fourth CoLBP feature images can be generated based on the fourth edge response feature images.

In step S1130, fourth normalized histograms corresponding to the fourth CoLBP feature images are calculated, and the fourth normalized histograms are connected to form the second target features of the second target regions.

The fourth normalized histograms corresponding to the fourth CoLBP feature images are calculated respectively, and the eight fourth normalized histograms are connected in a clockwise direction or a counterclockwise direction to form second target features. In addition, other connection modes may be used, and this exemplary embodiment does not specifically limit this.

In this exemplary embodiment, CoLBP is used to extract the second target features in the second target regions, the calculation method is simple, and the expression method is simple, the speed of extracting the second target features is fast and the extraction method is practical.

In step S430, the first target features and the second target features are connected to determine the local features of the face.

According to the extracted four first target features and three second target features, these seven target features can be connected in a clockwise or counterclockwise direction as local features of the face. In addition, other connection modes may be used, and this exemplary embodiment does not specifically limit this.

In exemplary embodiments of the present disclosure, symmetrical regions, and asymmetrical regions in the regions of interest are divided, targeted extraction is performed, and local features are determined with higher accuracy.

The seven local features and one global feature of the face can be obtained. In an example, the global feature is connected first and then the local features. In other examples, the local features connected first and then the global feature is connected. The result of the connection can be determined as the age features of the human face. In addition, other connection modes may be used, and exemplary embodiments of the present disclosure do not specifically limit this.

In step S130, the age feature is input to a pre-trained age recognition model to obtain an age value corresponding to the face in the image.

In an exemplary embodiment of the present disclosure, the pre-trained age recognition model may be trained based on age features and age value samples. Therefore, inputting the determined age features into the age recognition model can output the age value of the face.

In exemplary embodiments of the present disclosure, age features are obtained according to both global features and local features of a face, and inputting them into an age recognition model to realize the function of determining the age value of a face. On one hand, the impact of different image resolutions, genders, different poses and expressions on face age recognition is reduced. On the other hand, the algorithm has high accuracy and speed and can also be used for face age recognition based on embedded devices.

Figure 12:
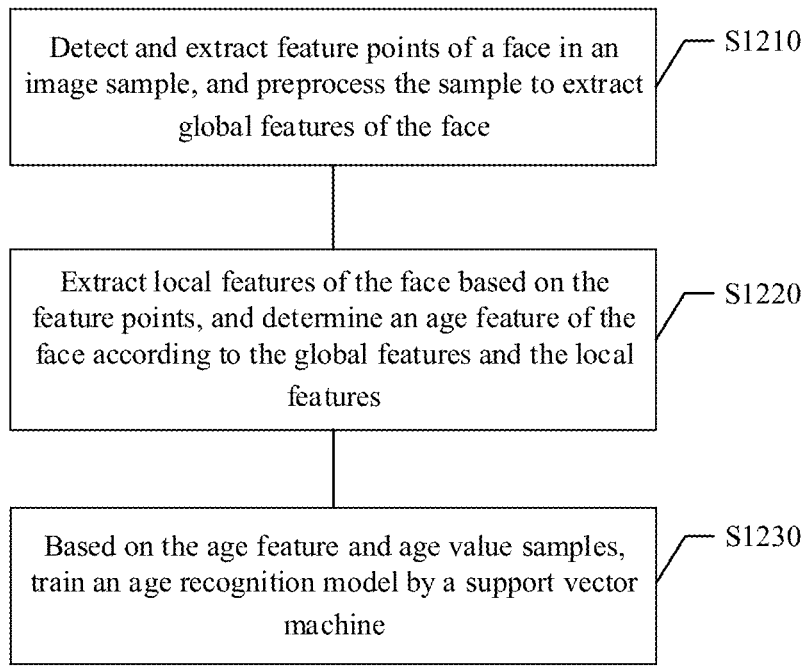
FIG. 12 schematically illustrates a flowchart of a method for training an age recognition model according to an exemplary embodiment of the present disclosure.

In view of the problems existing in the related art, the present disclosure also proposes a method for training an age recognition model. FIG. 12 shows a schematic flowchart of the training method for the age recognition model. As shown in FIG. 12, the method for training the age recognition model includes at least the following steps:

In step S1210, feature points of a face in an image sample are detected and extracted, and the image sample is preprocessed to extract global features of the face.

In step S1220, local features of the face are extracted based on the feature points, and age features of the face are determined according to the global features and the local features.

In step S1230, based on the age features and age value samples, an age recognition model is trained by a support vector machine.

In exemplary embodiments of the present disclosure, age features are obtained according to both global features and local features of a face, and an age recognition model is trained by a support vector machine. On one hand, the influence of different image resolutions, genders, different poses, and expressions on model construction is reduced. On the other hand, the training method is simple and fast and the training procedure is easy to learn, thereby laying a solid foundation for face age recognition.

Each step of the method for training the age recognition model is described in detail below.

In step S1210, feature points of a face in an image sample are detected and extracted, and the image sample is preprocessed to extract global features of the face.

In an exemplary embodiment of the present disclosure, the image samples may be selected from a set of images in which the age value samples of faces are known. The manner of extracting the global features of the human faces is the same as the specific implementation of step S110, and details are not described herein again.

In step S1220, local features of the face are extracted based on the feature points, and age features of the face are determined according to the global features and the local features.

The specific implementation of step S1220 is the same as that of step S120, and details are not described herein again.

In step S1230, based on the age features and age value samples, an age recognition model is trained by a support vector machine.

In an exemplary embodiment of the present disclosure, the Support Vector Machine (SVM) is a type of generalized linear classifier that performs binary classification of data in a supervised learning manner. The identified age features and age value samples are input to the SVM to train the face age recognition model. The kernel function of the SVM adopts a linear kernel function. Computational classification is performed by a kernel function, which is mainly used for linear classification, and has the advantages of few parameters and fast speed.

The age recognition method in the embodiments of the present disclosure will be described in detail below with reference to an application scenario.

Figure 13:
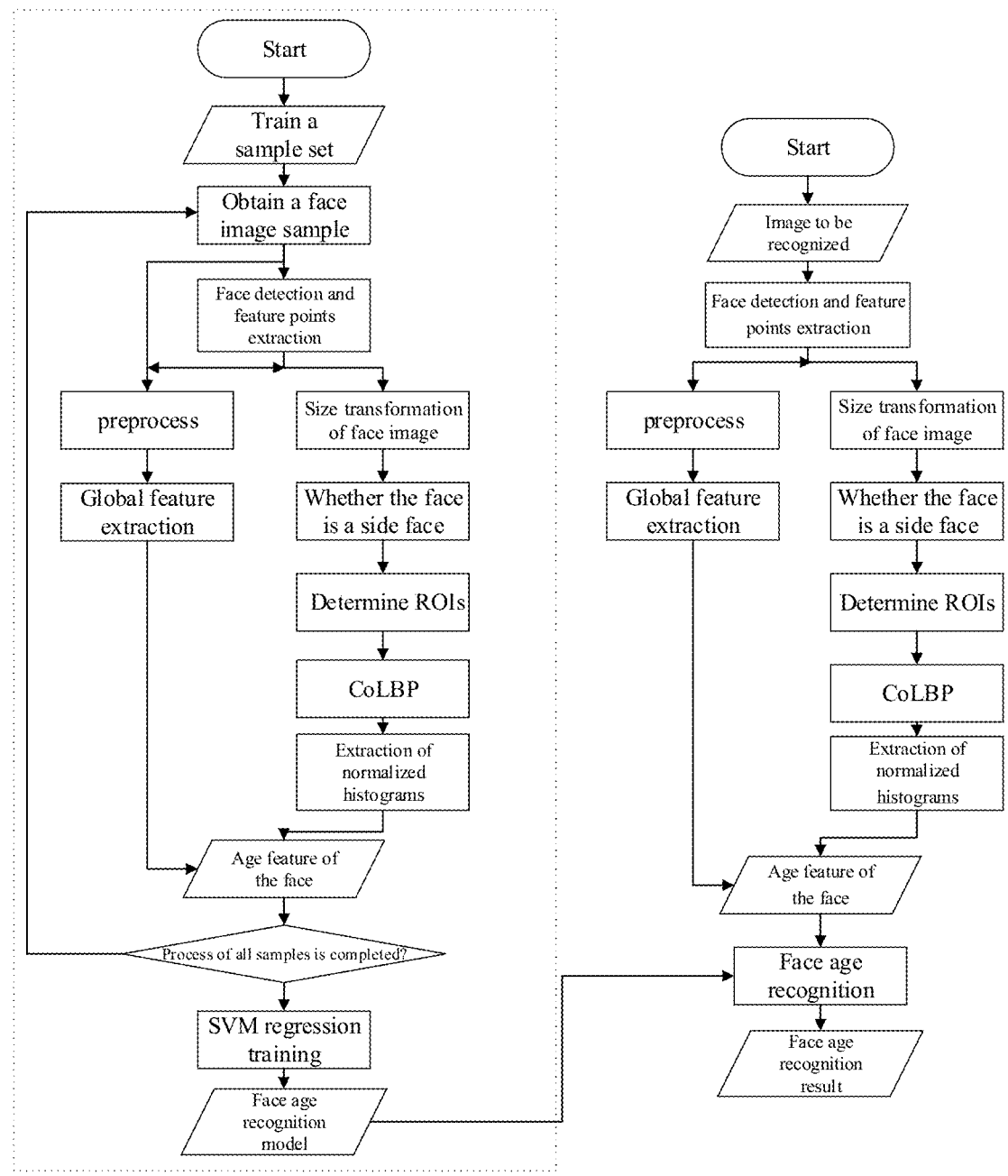
FIG. 13 is a schematic flowchart of an age recognition method in an application scenario according to an exemplary embodiment of the present disclosure.

FIG. 13 is a schematic flowchart of an age recognition method in an application scenario.

As shown in FIG. 13, in step S1310, an image may be obtained.

In step S1320, the feature points of the face in the image to be recognized are detected and extracted. The Dlib vision library can be used to perform face detection and extraction of 68 feature points of the face.

In step S1331, a pre-processing process such as noise-removal processing and affine transformation is performed on the image, and a corrected image after the pre-processing is obtained.

In step S1332, the global features of the face in the image can be extracted using an active shape model.

In step S1341, a size transformation is performed according to the feature points, that is, feature points are proportionally scaled according to the abscissas and the ordinates.

In step S1342, the regions of interest of the face can be determined according to the obtained feature points.

Figure 14:
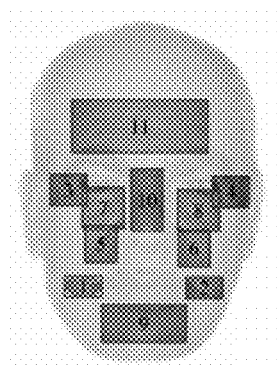
FIG. 14 schematically illustrates obtained regions of interest according to an exemplary embodiment of the present disclosure.

For example, there may be 11 regions of interest. FIG. 14 schematically illustrates obtained regions of interest. As shown in FIG. 14, there are 11 regions of interest, 4 pairs of the regions have a symmetrical relationship. Specifically, regions 1 and 2 are symmetrical with each other and can form a target region pair, regions 3 and 4 are symmetrical with each other and can form a target region pair, regions 5 and 6 are symmetrical with each other and can form a target region pair, and regions 7 and 8 are symmetrical with each other and can form a target region pair. There are 3 regions of interest that do not have a symmetric relationship with other regions. For example, regions 9, 10 and 11 do not have a symmetrical relationship with other regions.

In step S1343, whether the face in the image is a side face or a front face can be determined according to the size information of the 11 regions of interest.

For example, for the four pairs in FIG. 14, if a ratio between the widths of the regions in the left half of the face and the widths of the regions in the right half of the face is smaller than 0.5, it can be determined that the face in the image is a right side face; if a ratio between the widths of the regions in the left half of the face and the widths of the regions in the right half of the face is greater than 2, it can be determined that the face in the image is a left side face; it can be determined that the face in the image is a right side face; if a ratio between the widths of the regions in the left half of the face and the widths of the regions in the right half of the face is smaller than or equal to 2 and larger than or equal to 0.5, it can be determined that the face in the image is a front face In S1344, depending on whether the face is a side face or a front face, the CoLBP feature images can be generated by using CoLBP features.

In step S1345, the normalized histograms of the feature images are calculated and connected to obtain the local features of the face.

For example, if the face in the image is a left side face, for a ROI pair, the CoLBP features of the ROI in the left half of the face are extracted. For example, feature filters in eight directions are used to extract eight edge response feature images, LBP of the eight edge response feature images are extracted to generate eight CoLBP feature images. Eight normalized histograms of the eight CoLBP feature images are calculated, and the eight normalized histograms are connected to form the features of the ROI.

For example, if the face in the image is a right side face, for a ROI pair, mirror transformation is performed on the ROI in the right half of the face. CoLBP features of the ROI in the right half of the face are extracted. For example, feature filters in eight directions are used to extract eight edge response feature images, LBP of the eight edge response feature images are extracted to generate eight CoLBP feature images. Eight normalized histograms of the eight CoLBP feature images are calculated, and the eight normalized histograms are connected to form the features of the ROI.

For example, if the face in the image is a front face, for a ROI pair, mirror transformation is performed on the ROI in the right half of the face. CoLBP features of the two ROIs in the ROI pair are extracted. For example, feature filters in eight directions are used to extract eight edge response feature images, LBP of the eight edge response feature images are extracted to generate eight CoLBP feature images for each of the two ROIs. For each direction, eight normalized histograms of the eight CoLBP feature images are calculated for each of the two ROIs, and the normalized histograms are connected to form the features of the ROIs.

For the ROIs (for example, regions 9, 10 and 11 in FIG. 14) which have no symmetrical relationship with other regions, local features CoLBP of the regions may be extracted to calculate eight normalized histograms for each region and then the normalized histograms are connected to form the features of each ROI.

In step S1350, according to the determined global features and local features, the age features of the face can be obtained.

In step S1360, the age features are input into a trained age recognition model to perform face age recognition.

In step S1370, an age value corresponding to the face is finally obtained. Step S1380 provides a schematic flowchart of the training method of the age recognition model, which corresponds to steps S1310-S1370, and is not repeated here.

Figure 15A:
FIG. 15A schematically illustrates a region of interest in a face region of a front face according to an exemplary embodiment of the present disclosure.
Figure 15B:
FIG. 15B schematically illustrates a feature image of a region of interest in a 0-th direction according to an exemplary embodiment of the present disclosure.
Figure 15C:
FIG. 15C schematically illustrates a feature image of a region of interest in a first direction according to an exemplary embodiment of the present disclosure.
Figure 15D:
FIG. 15D schematically illustrates a feature image of a region of interest in a second direction extracted according to an exemplary embodiment of the present disclosure.
Figure 15E:
FIG. 15E schematically illustrates a feature image of a region of interest in a third direction according to an exemplary embodiment of the present disclosure.
Figure 15F:
FIG. 15F schematically illustrates a feature image of a region of interest in a fourth direction according to an exemplary embodiment of the present disclosure.
Figure 15G:
FIG. 15G schematically illustrates a feature image of a region of interest in a fifth direction according to an exemplary embodiment of the present disclosure.
Figure 15H:
FIG. 15H schematically illustrates a feature image of a region of interest in a sixth direction according to an exemplary embodiment of the present disclosure.
Figure 15I:
FIG. 15I schematically illustrates a feature image of a region of interest in a seventh direction according to an exemplary embodiment of the present disclosure.

FIGS. 15A to 15I show schematic diagrams of extracting third CoLBP feature images. As shown in FIG. 15A, the region of interest is a region of interest labeled 7 in FIG. 14, and the face is a front face. The image as shown in FIG. 15B is a third CoLBP feature image of the region of interest in the 0-th direction extracted by using an edge response operator. The image as shown in FIG. 15C is a third CoLBP feature image of the region of interest in the first direction extracted by using an edge response operator. The image as shown in FIG. 15D is a third CoLBP feature image of the region of interest in the second direction extracted by using an edge response operator. The image as shown in FIG. 15E is a third CoLBP feature image of the region of interest in the third direction extracted by using an edge response operator. The image as shown in FIG. 15F is a third CoLBP feature image of the region of interest in the fourth direction extracted by using an edge response operator. The image as shown in FIG. 15G is a third CoLBP feature image of the region of interest in the fifth direction extracted by using an edge response operator. The image as shown in FIG. 15H is a third CoLBP feature image of the region of interest in the sixth direction extracted by using an edge response operator. The image as shown in FIG. 15I is a third CoLBP feature image of the region of interest in the seventh direction extracted by using an edge response operator. Eight edge response operators are used to eight third CoLBP feature image so as to extract detailed features of the face.

Figure 16A:
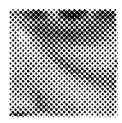
FIG. 16A schematically illustrates another symmetrical region of interest in a face region of a front face according to an exemplary embodiment of the present disclosure.
Figure 16B:
FIG. 16B schematically illustrates a mirrored front face region of another region of interest according to an exemplary embodiment of the present disclosure.
Figure 16C:
FIG. 16C schematically illustrates a feature image of another region of interest in a 0-th direction according to an exemplary embodiment of the present disclosure.
Figure 16D:
FIG. 16D schematically illustrates a feature image of another region of interest in a first direction according to an exemplary embodiment of the present disclosure.
Figure 16E:
FIG. 16E schematically illustrates a feature image of another region of interest in a second direction according to an exemplary embodiment of the present disclosure.
Figure 16F:
FIG. 16F schematically illustrates a feature image of another region of interest in a third direction according to an exemplary embodiment of the present disclosure.
Figure 16G:
FIG. 16G schematically illustrates a feature image of another region of interest in a fourth direction according to an exemplary embodiment of the present disclosure.
Figure 16H:
FIG. 16H schematically illustrates a feature image of another region of interest in a fifth direction according to an exemplary embodiment of the present disclosure.
Figure 16I:
FIG. 16I schematically illustrates a feature image in of another region of interest a sixth direction according to an exemplary embodiment of the present disclosure.
Figure 16J:
FIG. 16J schematically illustrates a feature image of another region of interest in a seventh direction according to an exemplary embodiment of the present disclosure.

FIGS. 16A to 16J show schematic diagrams of extracting a third CoLBP feature image. As shown in FIG. 16A, the region of interest is a region of interest labeled 8 in FIG. 14, that is a region which is symmetrical with the region of interest labeled 7. As shown in FIG. 16B, considering that the wrinkles on the human face are distributed in a radial manner, in order to ensure the directivity of the extraction of the features of the front face and reduce interference, a mirror transformation is performed on the ROIs and the transformation is a horizontal mirror transformation, that is, the left and right ROIs in each pair are mirror-transformed with the vertical center axis of the human face as the center. It can be seen that the features of the mirrored region are basically similar to the features of the other one in each ROI pair, that is, the pixel values are generally consistent. The image as shown in FIG. 16C is a third CoLBP feature image of the region of interest in the 0-th direction extracted by using an edge response operator. The image as shown in FIG. 16D is a third CoLBP feature image of the region of interest in the first direction extracted by using an edge response operator. The image as shown in FIG. 16E is a third CoLBP feature image of the region of interest in the second direction extracted by using an edge response operator. The image as shown in FIG. 16F is a third CoLBP feature image of the region of interest in the third direction extracted by using an edge response operator. The image as shown in FIG. 16G is a third CoLBP feature image of the region of interest in the fourth direction extracted by using an edge response operator. The image as shown in FIG. 16H is a third CoLBP feature image of the region of interest in the fifth direction extracted by using an edge response operator. The image as shown in FIG. 16I is a third CoLBP feature image of the region of interest in the sixth direction extracted by using an edge response operator. The image as shown in FIG. 16J is a third CoLBP feature image of the region of interest in the seventh direction extracted by using an edge response operator. Eight edge response operators are used to extract the third CoLBP feature image so as to extract detailed features of the face.

Based on the third CoLBP feature image extracted in the two ROIs of the front face, the pixel values in each direction can be traversed at the same time and normalized to generate eight normalized histograms. In addition, the eight normalized histograms are connected in a clockwise direction or a counterclockwise direction to generate the front face features of the regions of interest to form first target features, that is, the extracted local features of the human face. Pre-processing on the face in the image is continued and global features of the face are extracted to obtain the age features of the face. The age features are input to the trained age recognition model and the corresponding age value is obtained. If the human face is a left side face or a right side face, the specific implementation manners are the same, and details are not described herein again.

In exemplary embodiments of the present disclosure, age features are obtained according to both global features and local features of a face, and the age features are input to an age recognition model to determine an age value of the face. On one hand, the impact of different image resolutions, genders, different poses and expressions on face age recognition is reduced; on the other hand, the algorithm has high accuracy and speed, and can also be used for face age recognition based on embedded devices.

It should be noted that although steps in the above exemplary embodiments are described in a specific order, this does not require or imply that these steps must be performed in this specific order, or all steps must be performed to achieve the desired result. Additionally or alternatively, certain steps may be omitted, multiple steps may be combined into one step, and/or one step may be split into multiple steps, and so on.

Furthermore, although the various steps of the method of the present disclosure are described in a particular order in the drawings, this does not require or imply that the steps must be performed in that particular order or that all of the steps shown must be performed to achieve the desired result. Additionally or alternatively, certain steps may be omitted, multiple steps may be combined into one step, and/or one step may be split into multiple steps, and so on.

Through the description of the above embodiments, those skilled in the art can easily understand that the example embodiments described herein can be implemented by software, or by software in combination with necessary hardware. Therefore, the technical solutions according to the embodiments of the present disclosure may be embodied in the form of a software product, which may be stored in a non-volatile storage medium (which may be a CD-ROM, a U disk, a mobile hard disk, etc.) or on a network, and may include instructions to enable a computing device (which may be a personal computer, a server, a mobile terminal, or a network device, etc.) to execute the methods according to embodiments of the present disclosure.

In addition, in an exemplary embodiment of the present disclosure, there is also provided an electronic device capable of implementing the above methods.

An electronic device 1700 according to an embodiment of the present disclosure is described below with reference to FIG. 17. The electronic device 1700 shown in FIG. 17 is merely an example, and should not be construed as imposing any limitation on the functions and scope of use of the embodiments of the present disclosure.

Figure 17:
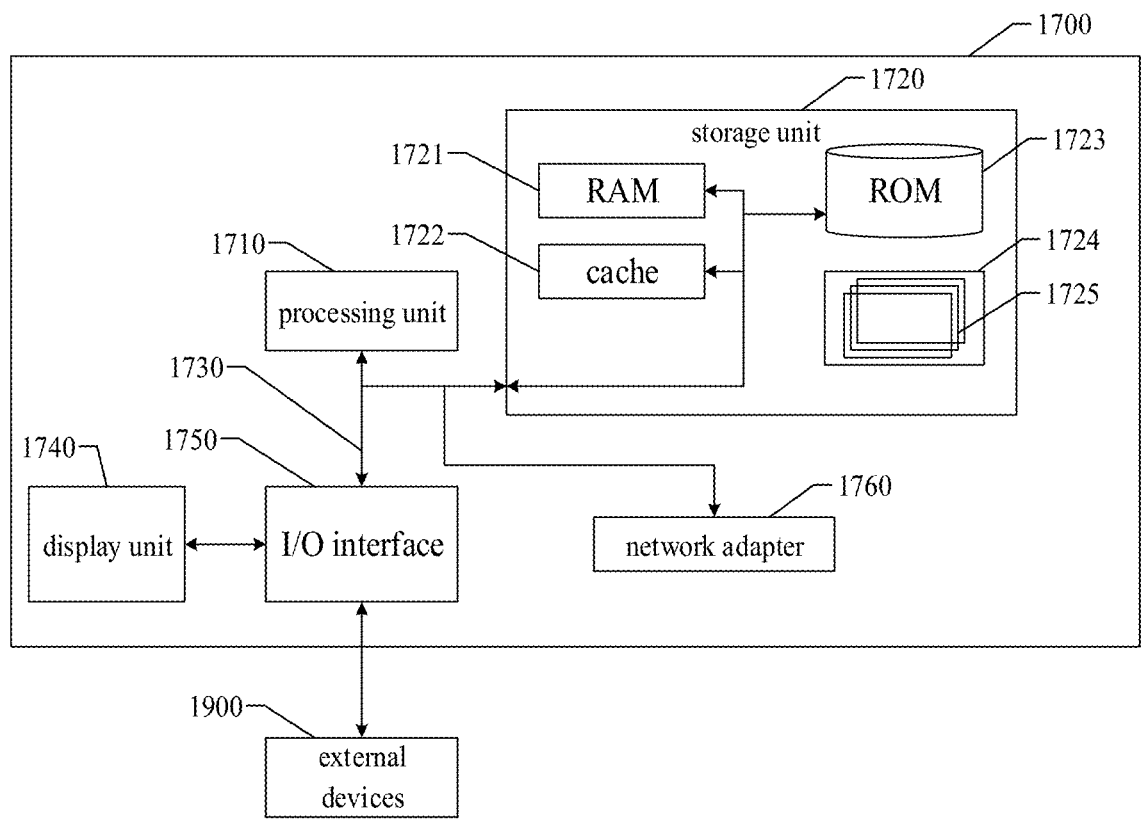
FIG. 17 schematically illustrates an electronic device for implementing an age recognition method according to an exemplary embodiment of the present disclosure.

As shown in FIG. 17, the electronic device 1700 is in the form of a general-purpose computing device. The components of the electronic device 1700 may include, but are not limited to, at least one processing unit 1710, at least one storage unit 1720, a bus 1730 connecting different system components (including the storage unit 1720 and the processing unit 1710), and a display unit 1740.

The storage unit stores program codes, and the program codes can be executed by the processing unit 1710, so that the processing unit 1710 executes steps of various exemplary embodiments of the present disclosure.

The storage unit 1720 may include a readable medium in the form of a volatile storage unit, such as a random access storage unit (RAM) 1721 and/or a cache storage unit 1722, and may further include a read-only storage unit (ROM) 1723.

The storage unit 1720 may also include a program/utility tool 1724 having a set (at least one) of program modules 1725. Such program modules 1725 include, but are not limited to, an operating system, one or more application programs, other program modules, and program data. Each or some combination of these examples may include an implementation of a network environment.

The bus 1730 may be one or more of several kinds of bus structures, including a memory unit bus or a memory unit controller, a peripheral bus, a graphics acceleration port, a processing unit, or a local area bus using any of a variety of bus structures.

The electronic device 1700 may also communicate with one or more external devices 1900 (such as a keyboard, pointing device, Bluetooth device, etc.), and may also communicate with one or more devices that enable a user to interact with the electronic device 1700, and/or with any device (e.g., router, modem, etc.) that enables the electronic device 1700 to communicate with one or more other computing devices. This communication can be performed through an input/output (I/O) interface 1750. Moreover, the electronic device 1700 can also communicate with one or more networks (such as a local area network (LAN), a wide area network (WAN), and/or a public network such as the Internet) through the network adapter 1760. As shown in this figure, the network adapter 1740 communicates with other modules of the electronic device 1700 through the bus 1730. It should be understood that although not shown in the figure, other hardware and/or software modules may be used in conjunction with the electronic device 1700, including but not limited to: microcode, device drivers, redundant processing units, external disk drive arrays, RAID systems, tape drives and data backup storage systems.

Through the description of the above embodiments, those skilled in the art can easily understand that the example embodiments described herein can be implemented by software, or by software in combination with necessary hardware. Therefore, the technical solution according to the embodiments of the present disclosure may be embodied in the form of a software product, which may be stored in a non-volatile storage medium (which may be a CD-ROM, a U disk, a mobile hard disk, etc.) or on a network, and may include instructions to cause a computing device (which may be a personal computer, a server, a terminal device, or a network device, etc.) to execute methods according to embodiments of the present disclosure.

In an exemplary embodiment of the present disclosure, a non-transitory computer-readable storage medium is also provided on which a program product capable of implementing the above-mentioned methods of the present specification is stored. In some possible embodiments, various aspects of the present disclosure may also be implemented in the form of a program product, which includes program codes. When the program products are run or executed on a terminal device, the program codes are used to make the terminal device perform the steps according to various exemplary embodiments of the present disclosure.

Figure 18:
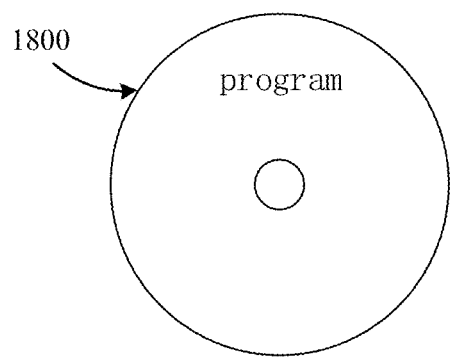
FIG. 18 schematically illustrates a non-transitory computer-readable storage medium for implementing an age recognition method according to an exemplary embodiment of the present disclosure.

Referring to FIG. 18, a program product 1800 for implementing the above methods according to embodiments of the disclosure is described, which may adopt a portable compact disc read-only memory (CD-ROM) and include program codes. The program product may be stored in a terminal device and run on a personal computer. However, the program product of the present disclosure is not limited thereto. The readable storage medium may be any tangible medium containing or storing programs, and the programs may be used by an instruction execution system, apparatus, or device, or may be used in combination with an instruction execution system, apparatus, or device.

The program product may employ any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of the readable storage media include: an electrical connection with one or more wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The non-transitory computer-readable signal medium may include a data signal in baseband or propagated as part of a carrier wave, in which a readable program code is carried. This propagated data signal can take many forms, including but not limited to electromagnetic signals, optical signals, or any suitable combination of the foregoing. The readable signal medium may also be any readable medium other than a readable storage medium, and the readable medium may send, transfer, or transmit a program for use by or in connection with an instruction execution system, apparatus, or device.

The program code contained on the readable storage medium may be transmitted using any appropriate medium, including but not limited to wireless, wired, optical fiber cable, RF, etc., or any suitable combination of the foregoing.

The program code for performing the operations of the present disclosure may be written in any combination of one or more programming languages, which include object-oriented programming languages, such as Java, C++, etc. and also include conventional procedural programming language, such as "C" or a similar programming language. The program code can be executed entirely on the user computing device, partly on the user device, executed as an independent software package, executed partly on the user computing device and partly on the remote computing device, or executed entirely on the remote computing device or server. In the case of a remote computing device, the remote computing device can be connected to the user computing device through any kind of network, including a local area network (LAN) or a wide area network (WAN), or may be connected to an external computing device (for example, using an Internet service provider to connect through the Internet).

Other embodiments of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope of the present disclosure is defined by the appended claims.

What is claimed is:

1. An age recognition method, comprising:
   extracting feature points of a face in an image and preprocessing the image to extract global features of the face;
   extracting local features of the face based on the feature points and determining an age feature of the face according to the global features and the local features by:
      performing size transformation on the face according to the feature points to determine regions of interest of the face;
      determining target regions in the regions of interest; and
      extracting target features of the target regions to determine the local features of the face, wherein the target regions comprise first target regions and at least one second target region, and the target features comprise first target features and second target features; and
   inputting the age feature into a pre-trained age recognition model to obtain an age value corresponding to the face in the image;
   wherein determining the target regions in the regions of interest, and extracting the target features of the target regions to determine the local features of the face comprises:
      determining the first target region pairs in the regions of interest, wherein each of the first target region pairs comprises two first target regions which have a symmetrical relationship with each other, and obtaining the first target features of each first target region pair;
      determining the at least one second target region in the regions of interest and obtaining the second target features of the at least one second target region, wherein the at least one second target region has no symmetrical relationship with other target regions among the regions of the interest; and
      connecting the first target features and the second target features to determine the local features of the face; and
   wherein determining the at least one second target region in the regions of interest and obtaining second target features of the at least one second target region comprises:
      determining the at least one second target region among the regions of the interest, and extracting fourth edge response feature images corresponding to the at least one second target region by using an edge response operator;
      extracting fourth Co-occurrence Local Binary Pattern (CoLBP) features corresponding to the fourth edge response feature images to generate fourth CoLBP feature images; and
      calculating fourth normalized histograms corresponding to the fourth CoLBP feature images, and connecting the fourth normalized histograms to form the second target features of the second target regions.

2. The age recognition method according to claim 1, wherein determining first target region pairs in the regions of interest and obtaining the first target features of each first target region pair, comprises:
   determining the first target region pairs in the regions of interest to determine whether the face in the image is a side face;
   if the face is a side face, extracting side face features of the side face as the first target features; and
   if the face is a front face, extracting front face features of the front face as the first target features.

3. The age recognition method according to claim 2, wherein determining whether the face in the image is a side face, comprises:
   obtaining size information of each of the two first target regions of the first target region pairs;
   performing calculation on size information of each of the two first target regions of the first target region pairs;
   if the calculation result satisfies a first preset condition, determining that the face in the image is a left side face;
   if the calculation result satisfies a second preset condition, determining that the face in the image is a right side face; and
   if the calculation result satisfies a third preset condition, determining that the face in the image is the front face.

4. The age recognition method according to claim 3, wherein, if the face is the side face, extracting side face features of the side face as the first target features, comprises:
   if the side face is the left side face, extracting left side face features of the left side face as the first target features; and
   if the side face is the right side face, extracting right side face features of the right side face as the first target features.

5. The age recognition method according to claim 4, wherein, if the side face is the left side face, extracting left side face features of the left side face as the first target features, comprises:
   if the side face is the left side face, extracting first edge response feature images corresponding to left first target region in each first target region pair by using an edge response operator;
   extracting the CoLBP features of the first edge response feature images to generate first CoLBP feature images; and
   calculating first normalized histograms corresponding to the first CoLBP feature images, and connecting the first normalized histograms to form the left side face features as the first target features.

6. The age recognition method according to claim 4, wherein, if the side face is the right side face, extracting right side face features of the right side face as the first target features, comprises:
   if the side face is the right side face, performing a mirror transformation on a right first target region in each of the first target region pairs to generate a mirrored target region;
   extracting second edge response feature images of the mirrored target region by using an edge response operator;
   extracting second CoLBP features corresponding to the second edge response feature images to generate second CoLBP feature images; and calculating second normalized histograms corresponding to the second CoLBP feature images, and connecting the second normalized histograms to form the right side face features as the first target features.

7. The age recognition method according to claim 2, wherein, if the face is the front face, extracting front face features of the front face as the first target features, comprises:
if the face is the front face, performing mirror transformation on a right first target region in each of the first target region pairs to generate a mirrored front face region;
extracting third edge response feature images corresponding to the mirrored front face region and a left first target region using an edge response operator;
extracting third CoLBP features corresponding to the third edge response feature images to generate third CoLBP feature images; and
calculating third normalized histograms corresponding to the third CoLBP feature images, and connecting the third normalized histograms to form the front face features as the first target features.

8. The age recognition method according to claim 1, wherein preprocessing the image to extract the global features of the face comprises:
performing noise-removal processing on the image by using Gaussian filtering to obtain a Gaussian filtered image;
performing an affine transformation on the Gaussian filtered image to correct the face and obtain a corrected image;
based on the corrected image, extracting the global features of the face using an active shape model.

9. A non-transitory computer-readable storage medium having stored thereon a computer program, wherein when the computer program is executed by at least one hardware processor, an age recognition method is performed comprising:
extracting feature points of a face in an image and preprocessing the image to extract global features of the face;
extracting local features of the face based on the feature points and determining an age feature of the face according to the global features and the local features by:
performing size transformation on the face according to the feature points to determine regions of interest of the face;
determining target regions in the regions of interest; and
extracting target features of the target regions to determine the local features of the face, wherein the target regions comprise first target regions and at least one second target region, and the target features comprise first target features and second target features; and
inputting the age feature into a pre-trained age recognition model to obtain an age value corresponding to the face in the image;
wherein determining the target regions in the regions of interest, and extracting the target features of the target regions to determine the local features of the face comprises:
determining the first target region pairs in the regions of interest, wherein each of the first target region pairs comprises two first target regions which have a symmetrical relationship with each other, and obtaining the first target features of each first target region pair;
determining the at least one second target region in the regions of interest and obtaining the second target features of the at least one second target region, wherein the at least one second target region has no symmetrical relationship with other target regions among the regions of the interest; and
connecting the first target features and the second target features to determine the local features of the face; and
wherein determining the at least one second target region in the regions of interest and obtaining the second target features of the at least one second target region, comprises:
determining the at least one second target region among the regions of the interest, and extracting fourth edge response feature images corresponding to the at least one second target region by using an edge response operator;
extracting fourth Co-occurrence Local Binary Pattern (CoLBP) features corresponding to the fourth edge response feature images to generate fourth CoLBP feature images; and
calculating fourth normalized histograms corresponding to the fourth CoLBP feature images, and connecting the fourth normalized histograms to form the second target features of the second target regions.

10. An electronic device, comprising:
at least one hardware processor having a memory;
program instructions stored in the memory and executable by the at least one hardware processor that, when executed, direct the at least one hardware processor to:
extract feature points of a face in an image, and preprocess the image to extract global features of the face;
extract local features of the face based on the feature points, and determine an age feature of the face according to the global features and the local features by:
performing size transformation on the face according to the feature points to determine regions of interest of the face;
determining target regions in the regions of interest; and
extracting target features of the target regions to determine the local features of the face, wherein the target regions comprise first target regions and at least one second target region, and the target features comprise first target features and second target features; and
input the age feature into a pre-trained age recognition model to obtain an age value corresponding to the face in the image;
wherein determining the target regions in the regions of interest, and extracting the target features of the target regions to determine the local features of the face comprises:
determining the first target region pairs in the regions of interest, wherein each of the first target region pairs comprises two first target regions which have a symmetrical relationship with each other, and obtaining the first target features of each first target region pair;
determining the at least one second target region in the regions of interest and obtaining second target features of the at least one second target region, wherein the at least one second target region has no symmetrical relationship with other target regions among the regions of the interest; and connecting the first target features and the second target features to determine the local features of the face; and wherein determining the at least one second target region in the regions of interest and obtaining second target features of the at least one second target region, comprises:

determining the at least one second target region among the regions of the interest, and extracting fourth edge response feature images corresponding to the at least one second target region by using an edge response operator;

extracting fourth Co-occurrence Local Binary Pattern (CoLBP) features corresponding to the fourth edge response feature images to generate fourth CoLBP feature images; and calculating fourth normalized histograms corresponding to the fourth CoLBP feature images, and connecting the fourth normalized histograms to form the second target features of the second target regions.

11. The electronic device according to claim 10, wherein the at least one hardware processor is further directed to:

determine the first target region pairs in the regions of interest to determine whether the face in the image is a side face;

if the face is a side face, extract side face features of the side face as the first target features; and if the face is a front face, extract front face features of the front face as the first target features.

12. The electronic device according to claim 11, wherein the at least one hardware processor is further directed to:

obtain size information of each of the two first target regions of the first target region pairs;

perform calculation on size information of each of the two first target regions of the first target region pairs;

if the calculation result satisfies a first preset condition, determine that the face in the image is a left side face;

if the calculation result satisfies a second preset condition, determine that the face in the image is a right side face; and if the calculation result satisfies a third preset condition, determine that the face in the image is the front face.

13. The electronic device according to claim 12, wherein the at least one hardware processor is configured to:

if the side face is the left side face, extract left side face features of the left side face as the first target features; and if the side face is the right side face, extract right side face features of the right side face as the first target features.

14. The electronic device according to claim 13, wherein the at least one hardware processor is configured to:

if the side face is the left side face, extract first edge response feature images corresponding to a left first target region in each first target region pair by using an edge response operator;

extract CoLBP features of the first edge response feature images to generate first CoLBP feature images; and calculate first normalized histograms corresponding to the first CoLBP feature images, and connect the first normalized histogram to form the left side face features as the first target features.

* * * * *